Oct. 1, 1968  C. F. MILLER  3,403,575
MICROMANIPULATOR
Filed March 14, 1966
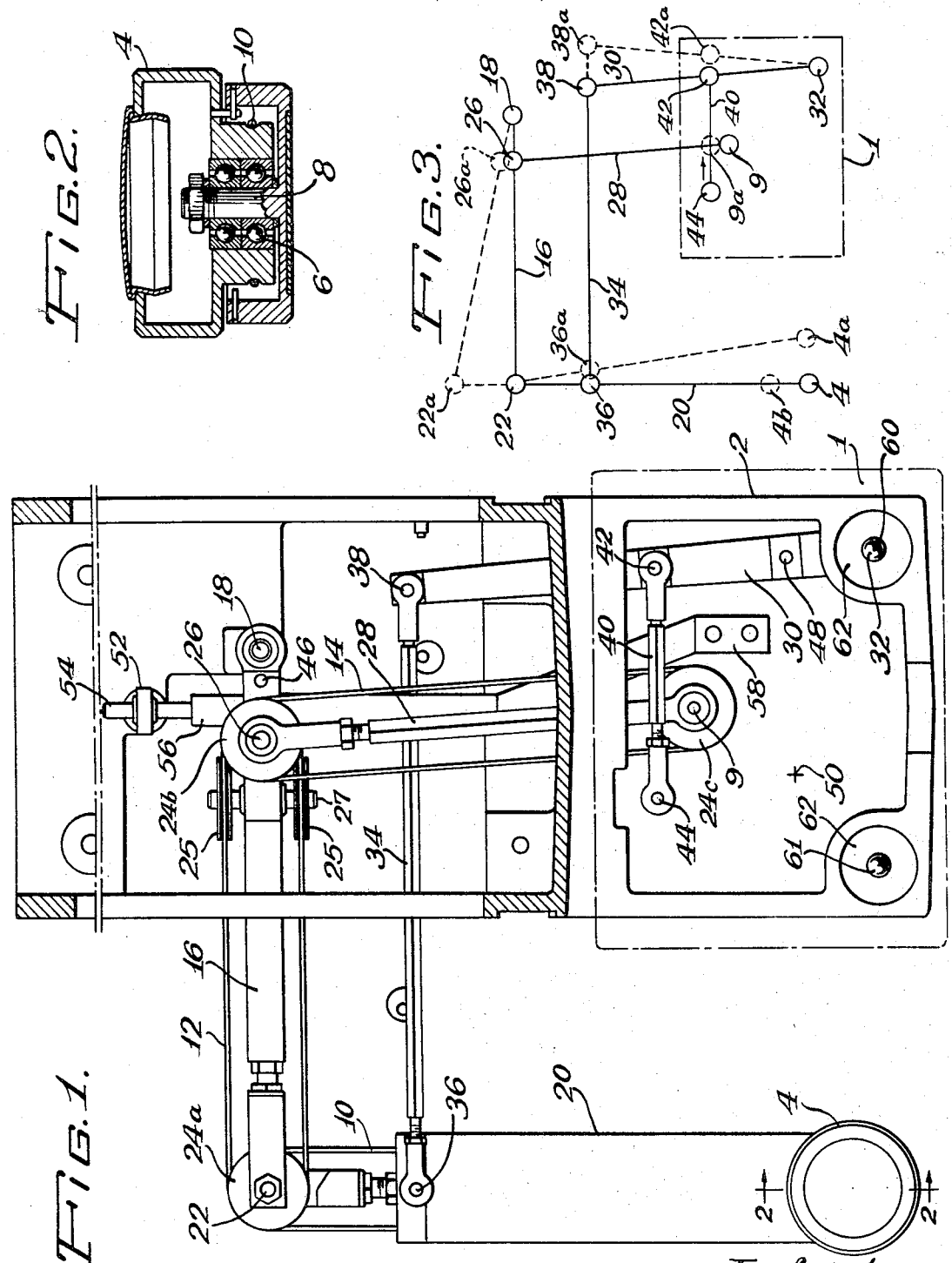
Inventor:
Charles Fredrick Miller
By Bair, Freeman & Molinare Attys.

3,403,575
MICROMANIPULATOR
Charles Fredrick Miller, Anaheim, Calif., assignor to Basic Products Corporation, a corporation of Wisconsin
Filed Mar. 14, 1966, Ser. No. 533,997
4 Claims. (Cl. 74—471)

ABSTRACT OF THE DISCLOSURE

A micromanipulator for positioning semi-conductor components on a work platform during fabrication. Interconnected lever arms are pivoted about a single point for movement of the platform in the Y direction. Similarly, interconnected lever arms are pivoted about a second point for movement of the platform in the X direction. All the arms are linked together so that movement of a single control lever arm in the X or Y directions causes a corresponding movement of the platform. A pulley and belt arrangement also connects the control arm with a shaft protruding vertically through the platform and enables an operator to rotate the shaft while simultaneously translating the platform.

---

This invention relates to a novel micromanipulator especially useful in conjunction with a machine for performing die and wire bonding operations on semi-conductor work pieces. In particular, this invention relates to a novel micromanipulator by which work pieces which are to be picked up or otherwise moved can be moved in a horizontal plane in both the X and Y directions and also in rotation, while at the same time providing an adjustable mechanical linkage for changing the mechanical advantage of movement.

There is described in my copending applications, Serial No. 533,998, filed Mar. 14, 1966, and Serial No. 588,273, filed Oct. 17, 1966, a universal die and wire bonding machine by which both die and wire bonding operations can be performed on partially completed semi-conductor work pieces. Broadly speaking, the machine comprises a frame to which is attached (1) a work station assembly moved by the novel micromanipulator of this invention for positioning partially completed semi-conductor work pieces upon which die or wire bonding operations are to be performed, (2) a horizontally-disposed arm movably secured to the frame and carrying at its outer end a bonding needle assembly movable vertically above the work station assembly and a die pick-up station, and (3) a novel microscope sighting means by which an operator of the machine may sight the tip of the needle, the partially completed work piece at the work station and the wire or die units which are to be secured to the partially-completed header by the bonding needle. The micromanipulator of this invention is designed particularly for use with the above-described machine which is capable of use as both a wire and die bonder.

It is thus an object of this invention to provide a novel micromanipulator means which can be used in a combination die and wire bonding machine.

It is a further object of this invention to provide a novel micromanipulator for movement of work pieces about a horizontal plane in both the X and Y directions and also in rotation.

Yet another object of this invention is to provide a novel micromanipulator means for movement of work pieces in die and wire bonding operations which manipulator is designed to provide adjustable mechanical advantage depending upon the sensitivity of movement required for the particular die or wire bonding operation.

Other objects of the invention will become apparent as it is described more fully hereinafter.

In the drawings:
FIG. 1 is a plan view showing the micromanipulator of the invention;
FIG. 2 is a view along line 2—2 of FIG. 1 showing a cross section of the control knob and its working mechanism; and
FIG. 3 is a diagrammatic sketch showing the mode of operation of the micromanipulator in the X and Y directions.

As noted above, the micromanipulator of this invention forms one element of a combination wire and die bonding machine described in the above cited copending applications. The micromanipulator is located toward the front of the machine and is beneath a mounting plate, shown diagrammatically in phantom lines at 1, upon which the work station assembly and, in die bonding, the dies to be assembled are positioned. Mounting plate 1 is maintained in a fixed vertical plane and is moved horizontally in the X–Y directions as hereinafter described. Mounting plate 1 is supported on frame 2 by means hereinafter described. Also a dice cup (not shown) is provided which is movable rotationally on the mounting plate as described hereinafter.

Referring to FIG. 1, the primary control element of the micromanipulator is manually operable control knob 4 which through the linkages described hereinafter controls the movement of mounting plate 1. Broadly, the linkages pivot about two fixed pivot points 18 and 32, as described hereinafter, point 18 being the pivot point for movement of plate 1 in the Y direction, point 32 being the pivot point for movement of plate 1 in the X direction. In addition the linkages with associated cables provide for rotational movement of a dice cup mounted on plate 1. Thus the dice cup moves along with plate 1 in the X and Y directions and can also be rotated to aid in lining a die for pick up and transport as described in the aforecited copending applications.

Control knob 4 rotates on bearing 6 as shown in FIG. 2 about shaft 8 and drives a taut, endless cable 10 which is supported about the lower end of knob 4 as shown in FIG. 2. The drive of cable 10 is continued through cables 12 and 14 and suitable pulley supports 24a, 24b and 24c to continue the rotational motion imparted by control knob 4 to a connection shaft 9 under and projecting up through mounting plate 1. A pair of pulleys 25 are arranged on a shaft 27 supported by link 16 and serve to change direction of cable 12 from horizontal to vertical so that pulley 24b can be elevated above link 16. This is desirable to permit knob 4 to be located at a lower level than mounting plate 1 as noted hereinafter. Shaft 9 is connected to a die pick-up station or dice cup (not shown) which rides on mounting plate 1. Rotation of knob 4 thus causes a corresponding rotation of shaft 9 which in turn rotates the dice cup.

The cable system is mounted upon a system of links which impart X and Y movement to mounting plate 1 with mechanical advantage. The main Y link 16 is hinged at fixed pivot point 18. Controlling link 20 is hinged to Y link 16 at pivot point 22. Pivot point 22 is also the location for double grooved pulleys 24 of the taut cable system.

At point 26 Y link 16 is pivotally connected to Y drag link 28. Link 28 in turn is pivotally connected at its other end through connection shaft 9 to mounting plate 1.

Movement of control knob 4 in the Y direction causes movement of mounting plate 1 correspondingly but reduced in ratio as the distance from 26 to 18 bears to the distance from 22 to 18. This is best seen in FIG. 3 by noting the relationship in length of the line between 22 and 22a and 26 and 26a. By well known trigonometric relationship, such distances will depend upon the ratio of the distance from 22 to 18 and 26 to 18. Movement of mounting plate 1 in the Y direction will of course cause corresponding movement of the work station assembly on plate 1 as well as any work pieces positioned thereon.

Movement of plate 1 in the X direction is effected by means of a compound linkage. X link 30 is pivotally connected at point 32 (under ball 60) to frame 2. At the opposite end of X link 30 tie link 34 is pivotally connected at point 38. In turn the other end of tie link 34 is pivotally connected at point 36 to control link 20. As shown in FIG. 1, these link connections are effected as appropriate by ball end rods at points 38 and 36 having in pairs right and left-hand threads in order to provide both freedom of movement for alignment and for set-up adjustment.

Motion of X link 30 in the X direction is transmitted to mounting plate 1 through X drag link 40 which is connected between point 42 of X link 30 and point 44 which is connected to mounting plate 1. Motion of mounting plate 1 in the X direction follows motion of control knob 4 in a compound manner corresponding but reduced by the product of two ratios of the X link system according to engineering practice so that the ratio of the X reduction is equal to the ratio of the Y reduction. These ratios in each direction may be changed as for instance in the X direction by moving the connection point of drag link 28 from pivot point 26 to new pivot point 46 and by shifting the X drag link 40 to a new location between pivot points 48 and 50. Such adjustment of ratios is necessary when adopting the bonder from a die to a wire bonder, or vice versa, since the sensitivity of movement for wire bonding is greater than for die bonding, as described hereinafter.

Mounting plate 1 is constrained to follow the motion imparted by the two connection points 9 and 44, or in the alternative 9 and 50, by the manner of its connection to machine frame 2 through a ball rod end 52. Shaft 54, extending from link 56 which is bolted to the bottom of plate 1 as shown at 58 engages the bore of ball rod end 52 and is free to slide axially within the ball or to move pivotally by rotation of the ball member. Thus, any motion imparted to mounting plate 1 is effected as a straight line path in the Y direction and arcuate path in the X direction about the ball rod end 52 as a center. The motion of mounting plate 1 in the Y direction is further modified from its straight line path through the constraint of pivoting along arcuate path of point 44, or alternatively point 50, of drag link 40 which pivots about point 42, or alternatively point 48. Modifications to the motion of mounting plate 1 from a true correspondence to the motion of control knob 4 are slight and are imperceptible to observation even under high magnification by microscope.

Mounting plate 1 is further allowed to move freely under the action of the manipulator by the manner of its support upon frame 2. The front edge of plate 1 is supported on two balls 60 and 61 which roll upon the surfaces of hardened disks 62. Disks similar to 62 are disposed within mounting plate 1 on its bottom (not shown). In this manner there is virtually no friction in the motion of mounting plate 1 following the control motion of the micromanipulator. Mounting plate 1 is supported at the third point by link 56 which is attached as hereinbefore described at 58 to the bottom of plate 1.

The manipulator of this invention provides further advantage in that control link 20 is disposed to project directly toward the operator from the machine structure so as to be out of the way of any other hand motions or any other use of table space. In most other manipulator systems, the control link is disposed from the above or from the right or left or from below necessitating a large clearance hole in the working surface.

The manipulator of this invention further allows transmission of rotational control through the taut bands as described above with band pivots located at link pivot points so that tension is maintained constant. The use of taut cables provides a solid feel by manual gripping with precise response. The manipulator of the design of this invention further permits mounting plate 1 to be located in a plane elevated with respect to the plane of movement of control knob 4. Thus, mounting plate 1 and the work station and pick-up stations may be properly located at a raised elevation so that the work station is at the precise focal point of the microscope as is described in copending application Ser. No. 534,245, filed Mar. 14, 1966. The location of pivot point 32 is also elevated so that there is provided clear access space below the work area.

Operation of the micromanipulator in the X–Y directions is best seen by reference to FIG. 3. With regard to movement in the X direction, assume control knob 4 is moved to the right to position 4a. Control link 20 is then pivoted about point 22 and pivot point 36 is moved to the right to new position 36a. Link 34 is correspondingly moved to the right forcing point 38 to the right to new point 38a and point 42 on link 30 to the right to point 42a. This in turn moves point 44 to the right and correspondingly mounting plate 1. The links and points of connection of the various full linkages can be designed to provide whatever mechanical advantage is desired.

With respect to movement in the Y direction, assume that control knob 4 is pushed upward to point 4b. Point 22 is raised accordingly to point 22a and link 16 pivots about point 18 with point 26 moving to new position 26a. Point 9 correspondingly moves to new point 9a and mounting plate 1 correspondingly moves upward.

It should be understood that the micromanipulator hereinabove described provides a novel and particularly useful means for moving a mounting plate in the X–Y direction and also for rotating a die cup holder on the mounting plate. The manipulator is particularly useful with a machine capable of performing both wire and die bonding operation since the linkages can be adjusted to change the mechanical advantage of movement. This is important since in die bonding less precise movement is necessary than in wire bonding where it is required to have a high mechanical advantage to permit very small movement of micro parts by manual operation of the control knob.

For example, in wire bonding it is desirable to move the upper end of link 28 from pivot point 26 as shown in FIG. 1 to pivot point 46. This provides for a smaller movement in the Y direction of mounting plate 1 when control knob 4 is moved in the Y direction. Correspondingly, for wire bonding, it is desirable that link 40 be connected across points 50 and 48 rather than points 44 and 42 as shown in FIG. 1. This also provides for more precise and minute movement of mounting plate 1 in the X direction upon movement of control knob 4.

Those skilled in the art will recognize that various modifications can be made to the micromanipulator of this invention within the scope of the invention which I intend to be limited solely by the following claims.

I claim:

1. Micromanipulator for rotating a first station and for translating said first station and a second station in a two coordinate plane direction in response to corresponding movements of manually controlled means in in said two coordinate plane, said manipulator comprising first linkage means rotatable about a first fixed pivot point for translating said stations in substantially one of said coordinate directions, said first linkage means operatively secured to said manually controlled means and to said first and second stations, said second linkage means rotatable about a second fixed point distinct from said first fixed point for translating said stations in substantially the other of said coordinate directions, said second linkage means secured to said first linkage means and said second station, and means connecting said manually controlled means to said first station for rotating said first station in response to corresponding rotation of said manually controlled means.

2. Micromanipulator of claim 1 wherein said means for rotation comprises a plurality of endless cables supported and guided by a plurality of pulleys rotatably linking said manually controlled means to said station.

3. Micromanipulator of claim 1 wherein said first and second linkage means are adjustable to change the mechanical advantage of said micromanipulator for movement in the two coordinate plane.

4. Micromanipulator for rotating a first station and for moving said first station and a second station in a two coordinate plane in response to corresponding movements of manually-controlled means comprising a first plurality of linkages rotatable about a first fixed point for translating said stations in substantially one of said coordinate directions and secured at one end to said manually controlled means and at the other end to said first and second stations, a second plurality of linkages rotatable about a second fixed point distinct from said first fixed point for translating said stations in substantially the other of said coordinate directions and secured at one end to one of said first linkages and at the other end to said second station, and means connecting said manually controlled means to said first station for rotating said first station in response to corresponding rotation of said manually controlled means, said connecting means comprising a plurality of endless cables supported and guided by pulleys rotatably linking said manually controlled means to said first station.

References Cited

UNITED STATES PATENTS

| 3,088,328 | 5/1963 | Peterson | 74—471 |
| 3,085,593 | 4/1963 | Sorensen | 74—471 |
| 3,125,906 | 3/1964 | Johnson | 74—471 |
| 3,188,879 | 6/1965 | Conley | 74—471 |

OTHER REFERENCES

Product Engineering, publication, pp. 150 and 151, June 1956.

C. J. HUSAR, *Primary Examiner.*